3,356,784
APPARATUS FOR VARYING AN ALTERNATING CURRENT FLOWING IN A LOAD TO CONTROL THE VALUE OF A PARAMETER SUCH AS THE TEMPERATURE OF A FURNACE
Michael Murray Bertioli, Lichfield, and Maurice James Wright, Birmingham, England, assignors to Joseph Lucas (Industries) Limited, Birmingham, England
Filed Mar. 2, 1965, Ser. No. 436,624
Claims priority, application Great Britain, Mar. 3, 1964, 8,875/64
12 Claims. (Cl. 13—24)

ABSTRACT OF THE DISCLOSURE

An A.C. control circuit varies the current flowing in a load, which may be the heater of a furnace, so as to control the temperature of the furnace. The control circuit includes switch means which is turned off at the end of each cycle or half-cycle of an A.C. supply, and is turned on again at the commencement of the next cycle or half-cycle depending on whether a bistable circuit is driven from a first state to a second state at the commencement of the half-cycle or cycle of the supply. A bistable circuit is driven to the second state by the A.C. supply, provided that it is not already in the second state, the bistable circuit being driven from the second state to the first state from time to time by a pulse generator which has a frequency dependent on the value of the temperature of the furnace, or other parameter being controlled. As long as the value of the parameter is below a predetermined value, the frequency of the pulse generator is greater than the frequency of the A.C. supply, and so the bistable circuit is always driven to its first state during a cycle or half-cycle, and driven back to its second state by the A.C. supply at the commencement of the next cycle or half-cycle so that the switch means remains on permanently. However, as the temperature or other parameter increases, the frequency of the pulse generator decreases, and for some cycles or half-cycles of the A.C. supply the switch means remains off.

In the known circuit, alternating current is fed to a load through controlled rectifiers which can conduct when they are positively biased, and are switched off during the negative half-cycles of the supply by the reverse voltage across them. The mean current in the load is controlled by varying the instants at which the rectifiers are fired when they are positively biased. This system of control has the disadvantage that a controlled rectifier may be fired at an instant when the alternating supply voltage has a high value, which produces serious radio interference. Moreover, where a number of independent loads are being controlled and each load is supplied by the same A.C. source, there is a tendency for firing of a controlled rectifier controlling one load to cause firing of a controlled rectifier controlling another load prematurely.

This invention, which is not limited to the use of controlled rectifiers, sets out to reduce or obviate these disadvantages.

In one aspect, the invention resides in a method of controlling the mean alternating current flowing in a load by operating switch means in series with the load to vary the on-off periods of the switch means, characterised in that the switch means is turned on and off at instants when the current flow through the load is substantially zero.

In another aspect, the invention resides in an A.C. control circuit including a load connected in use across the A.C. supply in series with switch means, and means for turning the switch means on and off to vary the mean alternating current flowing in the load, characterised in that the switch means is turned on and off at instants when the current flow through the load is substantially zero.

Figure 1:
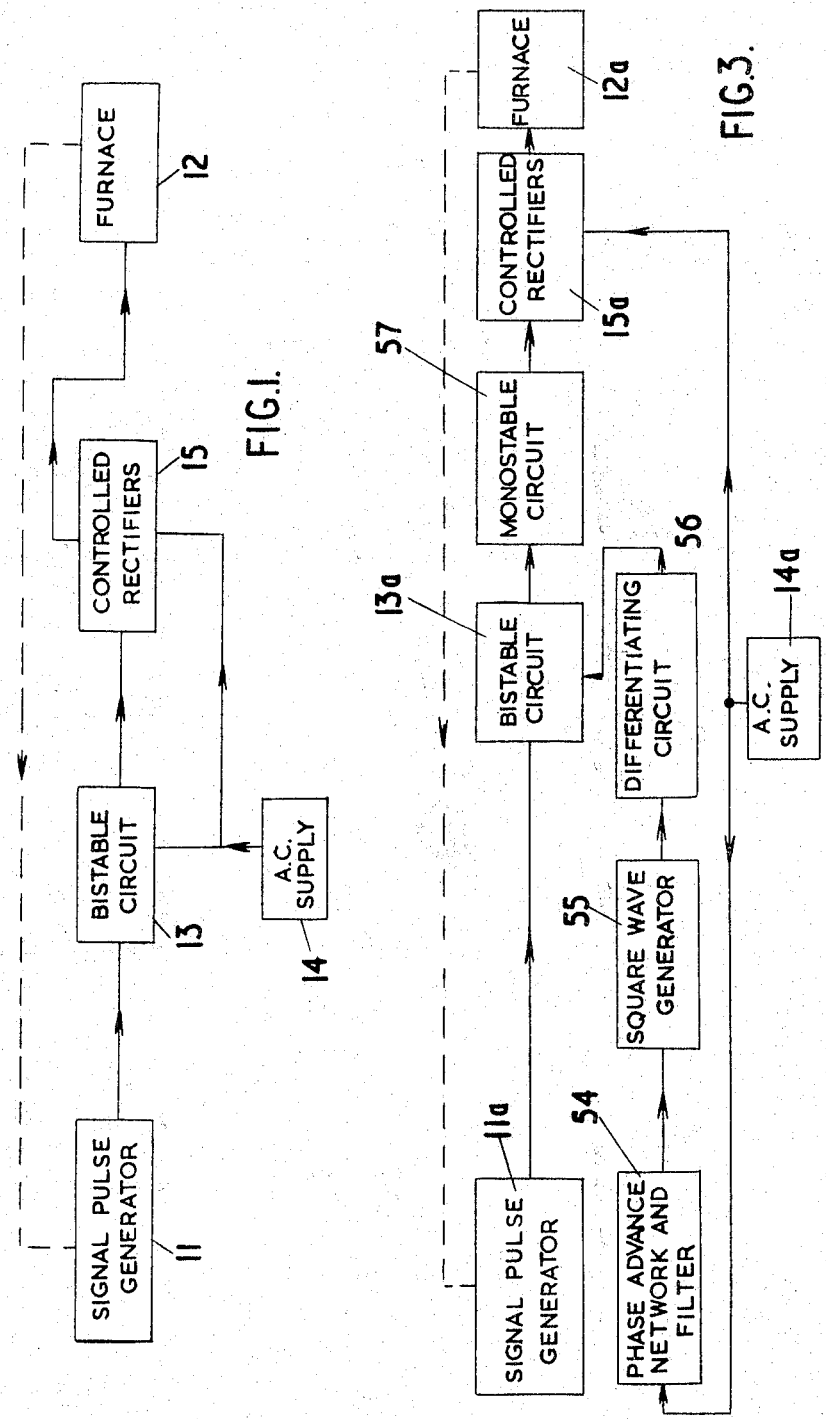
Figure 2:
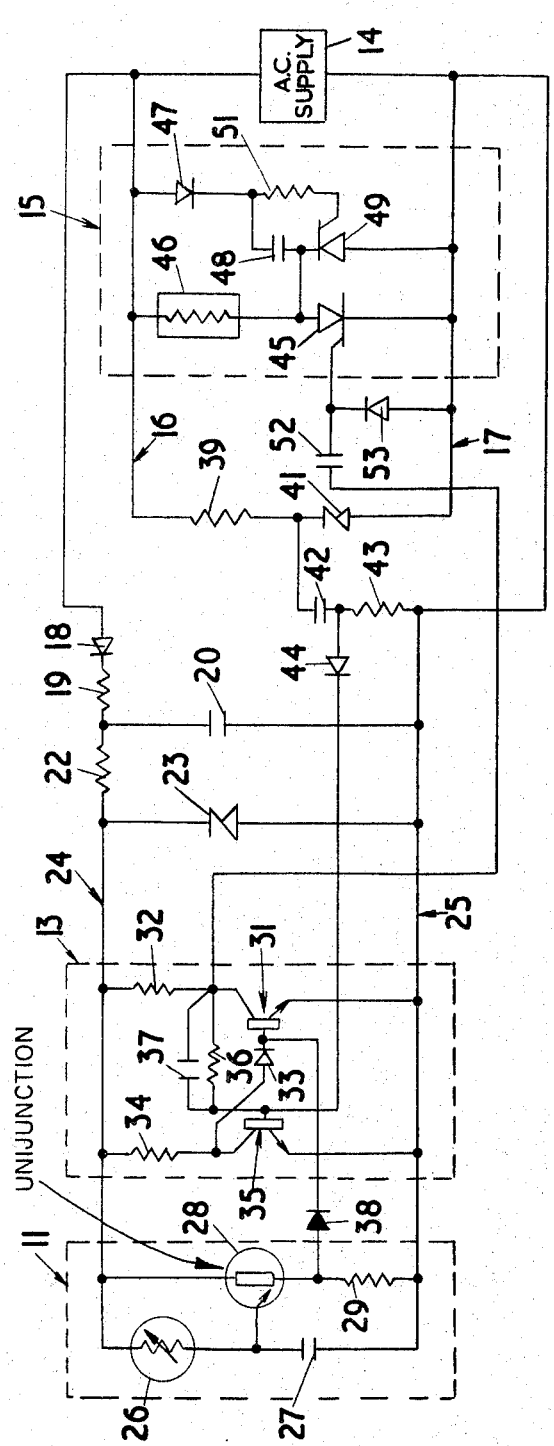
Figure 4:
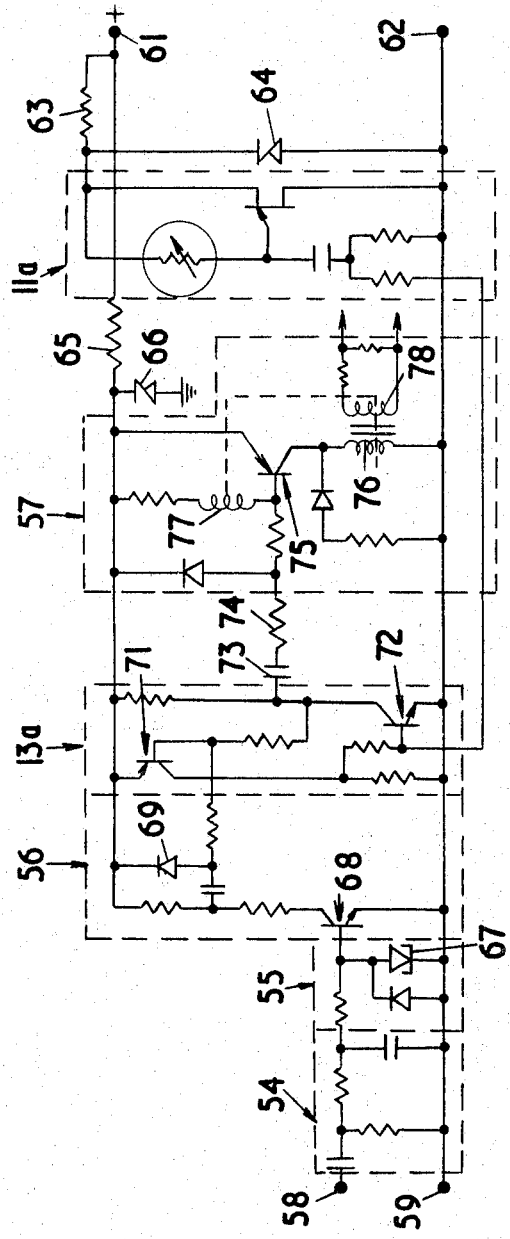
Figure 5:
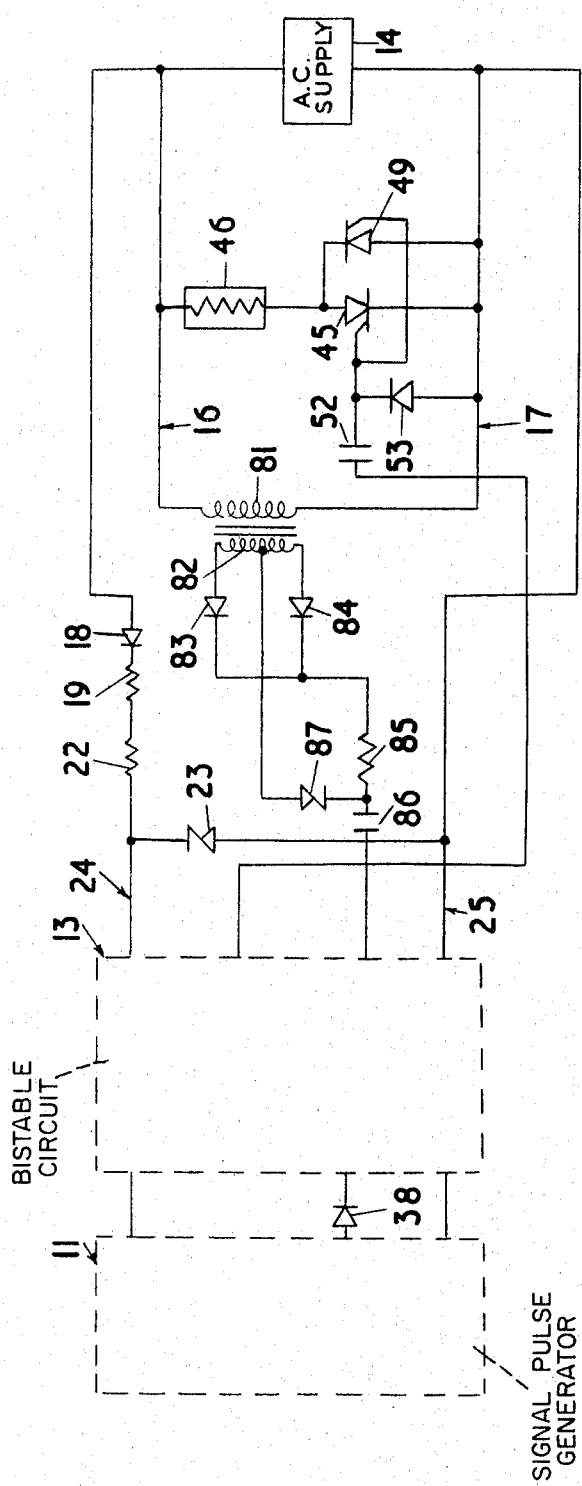

In the accompanying drawings, FIGURE 1 is a block diagram illustrating one example of the invention as applied to the control of the temperature of an electric furnace, FIGURE 2 is a circuit diagram corresponding to FIGURE 1, FIGURE 3 is a block diagram illustrating another example of the invention as applied to the control of the temperature of an electric furnace, FIGURE 4 is a circuit diagram corresponding to FIGURE 3, and FIGURE 5 is a circuit diagram, partly in block form, showing a modification of the circuit shown in FIGURE 2.

Referring to FIGURE 1, there is provided a signal pulse generator 11 which produces a signal at a frequency dependent upon the temperature of the furnace 12, as indicated by the dotted line. This signal is fed to a bistable circuit 13 and serves to drive the bistable circuit to a first state. The bistable circuit is driven to a second state by an A.C. supply 14 at the commencement of a cycle of the supply 14, and the arrangement is such that each time the bistable circuit is driven to the second state, it fires controlled rectifiers 15 which permit current to flow from the supply 14 to the heating elements of the furnace 12 for a full cycle of the A.C. supply.

In operation, when the temperature of the furnace is below a predetermined variable value the frequency of the generator 11 is greater than that of the supply 14. Thus, during each cycle of the supply 14 the generator 11 will drive the circuit 13 to its first state, so that the rectifiers 15 will be fired again at the commencement of the next cycle of the supply 14. However, when the predetermined value is exceeded, the frequency of the generator 11 falls below the frequency of the supply 14, and as a result there will be some cycles of the supply 14 during which the circuit 13 is not driven to its first state. The effect of this will be that at the commencement of the next cycle of the supply 14 the controlled rectifiers will not be fired, and current flow to the heating elements will be interrupted for a full cycle. One or more successive cycles of supply to the load may be missed, depending on the frequency of the generator 11.

FIGURE 2 shows the full circuit diagram. The supply 14 supplies power to A.C. lines 16, 17 and also has its output terminals interconnected through a diode 18, a resistor 19 and a capacitor 20 in series, the capacitor 20 being bridged by a resistor 22 and Zener diode 23 in series. These components supply stabilised D.C. to lines 24, 25.

The generator 11 is a relaxation oscillator including a device 26 and capacitor 27 connected in series between the lines 24, 25, the device 26 having a resistance dependent on the temperature of the furnace. A point intermediate the device 26 and the capacitor 27 is connected to the emitter of a uni-junction transistor 28, the secondary base of which is connected to the line 24 and the primary base which is connected to the line 25 through a resistor 29. The arrangement is such that in use the capacitor 27 charges through the device 26 until the transistor 28 breaks down, at which point the capacitor discharges through the resistor 29. The rate of charge of the capacitor 27, and consequently the frequency of the generator, is dependent on the resistance of the device 26, which increases with increasing temperature in the furnace, so reducing the frequency. In one arrangement the device 26 is a light-sensitive resistance the value of which is determined by the position of a galvanometer arm which interrupts light falling on the device 26. The position of the arm is determined by two opposing currents, one of which is variable to select the desired furnace temperature, and the other of which is dependent on the actual furnace temperature.

The bistable circuit 13 includes an n-p-n transistor 31 having its emitter connected to the line 25, its collector connected to the line 24 through a resistor 32, and its base connected to the line 24 through a diode 33 and a resistor 34 in series. A point intermediate the diode 33 and resistor 34 is connected to the collector of a second n-p-n transistor 35 having its emitter connected to the line 25 and its base connected to the collector of the transistor 31 through a resistor 36 and a capacitor 37 in parallel.

The circuit 13 receives input signals from the generator 11 and the supply 14. The signal from the generator 11 is supplied through a diode 38 having its anode connected to the primary base of the transistor 28 and its cathode connected to the base of the transistor 31. In order to obtain the input from the supply 14, a resistor 39 and Zener diode 41 are connected across the lines 16, 17, the diode 41 being bridged by a capacitor 42 and resistor 43 in series. A point intermediate the capacitor 42 and resistor 43 is connected to the base of the transistor 35 through a diode 44.

The bistable circuit operates in known manner, signals applied from the pulse generator serving to render the transistor 31 conductive and the transistor 35 non-conductive so that the bistable circuit is in a first state. Signals from the supply 14 are squared by the Zener diode 41, differentiated by the capacitor 42 and resistor 43, and the positive components are applied to the base of the transistor 35 to render the transistor 35 conductive and the transistor 31 non-conductive so that the bistable circuit is driven to a second state. The A.C. supply is conveniently a mains supply, and the bistable circuit is driven to its second state substantially instantaneously at the commencement of a cycle of the mains supply.

As previously explained with reference to FIGURE 1, the bistable circuit is driven to its second state at the commencement of each cycle of the A.C. supply, unless of course the bistable circuit is already in the second state. Thus, when the frequency of the pulse generator is above a predetermined value, the bistable circuit will always be driven to its first state during the cycle of the A.C. supply, and so an output will be obtained from the bistable circuit at the commencement of each cycle of the A.C. supply. However, if the pulse generator frequency is below the predetermined value, the bistable circuit will not be driven to its first state during a cycle, and so no output will appear from the bistable circuit at the commencement of the next cycle, because the bistable circuit will not be driven to its second state.

The circuit for controlling current flow in the load includes a controlled rectifier 45 having its cathode connected to the lines 17, and its anode connected to the line 16 through the furnace heater elements 46. The lines 16, 17 are further interconnected through a series circuit including the anode and cathode of a diode 47, a capacitor 48, and the cathode and anode of a second controlled rectifier 49. A point intermediate the capacitor 48 and the controlled rectifier 49 is connected to the anode of the controlled rectifier 45, and a point intermediate the diode 47 and capacitor 48 is connected through a resistor 51 to the gate of the uncontrolled rectifier 49.

The output from the bistable circuit is taken from the collector of the first transistor, and is connected to one side of a capacitor 52 the other side of which is connected to the gate of the controlled rectifier 45 and, through a diode 53, to the line 17. Assuming that at the commencement of a positive cycle of the supply 14 the circuit 13 is driven to its second state, the output from the circuit 13 fires the controlled rectifier 45 so that current flows in the elements 46 and at the same time the capacitor 48 is charged through the diode 47 and the controlled rectifier 45. After the first half of the positive half-cycle, the capacitor 48 starts to discharge, and at the termination of the positive half cycle, the controlled rectifier 45 is cut off by the reverse voltage across it, the capacitor 48 simultaneously continuing to discharge through the resistor 51 and the gate and cathode of the controlled rectifier 49 to fire the controlled rectifier 49, so that current continues to flow through the elements 46 through the controlled rectifier 49. At the end of the negative half cycle, the controlled rectifier 49 is cut off by the reverse voltage across it, and the arrangement is such that at this time the capacitor 48 has substantially completely discharged.

It will be noted that by virtue of the connections within the bistable circuit 13, the circuit will assume a temporary state with both transistors conducting in the event that two input pulses arrive simultaneously. However, since the output is taken from the transistor 31, the output is the same as if the circuit is in the first state. Moreover, the arrangement is such that pulses from the generator 11 are narrower than those from the supply 14, and so if two pulses arrive simultaneously the circuit 13 will first be driven to its first state and then to its second state to produce an output.

The circuit described with reference to FIGURES 1 and 2 operates satisfactorily, but a more refined version of the circuit is shown in FIGURES 3 and 4, wherein components equivalent to those shown in FIGURES 1 and 2 are designated by the same reference numerals with the suffix a. In this example, the signal from the A.C. supply 14a is fed to the bistable circuit 13a by way of a phase advance and filtering network 54 which advances the phase of the signal slightly, a square wave generator 55 which converts the output from the network 54 to a square wave, and a differentiating circuit 56. Moreover, the circuit 13a does not trigger the rectifiers 15a directly, but instead triggers a monostable circuit 57 which in turn triggers the rectifiers 15a. The result of the additional components is that the circuit 13a is triggered slightly before the end of a negative half-cycle of the supply 14a. Thus, a signal is applied to the rectifiers 15a by the circuit 57 during the negative half-cycle, but this signal has no effect until the commencement of the next positive half-cycle. The period of the circuit 57 must be longer than the delay introduced by the network 54. This modification in the circuit ensures that the rectifiers are fired immediately at the commencement of a positive half-cycle; in FIGURES 1 and 2 there may in certain circumstances be a slight delay in firing the rectifiers 15 in view of the operating time of the circuit. It should be noted that this delay is very slight and so for practical purposes it can be assumed to be zero.

FIGURE 4 shows the circuit diagram corresponding to FIGURE 3 but with the rectifiers 15a omitted, this part of the circuit being identical to FIGURE 2. Terminals 58, 59 are provided connected to the supply 14a, and terminals 61, 62 provide a rectified and smoothed output from the supply 14a. A resistor 63 and Zener diode 64 provide a stabilised input to the generator 11a, and a separate resistor 65 and Zener diode 66 provide a stabilised input to the circuits 56, 13a, 57. The reason for using separately stabilised inputs is to reduce any risk of unwanted switching where, as often happens, two or more circuits of the kind shown are operated from the same rectified power supply between terminals 61, 62.

The network 54 is of standard form providing an input to the generator 55, which as shown incorporates a tunnel diode 67 producing the required square wave output. This output is applied to the base of a transistor 68 in the differentiating circuit, which acts in known manner to produce negative and positive output pulses at the commencement and end respectively of each square wave. The positive pulses are conducted by a diode 69, and the negative pulses are fed to the base of a transistor 71 in the bistable circuit 13a. The circuit 13a includes a second transistor 72 and has two states with the transistors 71, 72 either both on or both off. The base of the transistor 72 receives an input from the generator 11a, and the arrangement is such that if the transistors 71, 72 are off and a negative signal is received from the circuit 56, the circuit 13a switches to its state with transistors 71, 72 on and a negative output pulse is applied by way of a capacitor 73 and resistor 74 to trigger the monostable circuit 57.

The pulses from the circuit 56 are wider than those from the generator 11a, and in the event of simultaneous arrival of two pulses an output will be obtained at the termination of the pulse from the generator 11a, as in FIGURE 2.

The output pulses from the bistable circuit 13a are applied to the base of a transistor 75 in a monostable circuit so that the current flows in the primary winding 76 of a transformer in the collector circuit of the transistor 75. A feedback winding 77 is included in the base circuit of the transistor 75, so that current flow in the primary winding builds up rapidly by regenerative action until either the transformer saturates or the transistor 75 can no longer supply an increasing current to the winding 76. As previously stated, the circuit 15 is as shown in FIGURE 2, and the output from the secondary winding 78 of the transformer is applied between the gate and cathode of the controlled rectifier 45.

In the two examples described, current is supplied to the load for full cycles, but if desired the mean current can be controlled by supplying current for half-cycles. This can be done quite simply by arranging for the supply 14 to trigger the bistable circuit at the commencement of each half-cycle instead of each cycle, and arranging for one or other of the rectifiers 45, 49 to be rendered conductive. The components for firing the rectifier 49 when the rectifier 45 switches off are no longer required.

FIGURE 5 shows a modification of FIGURE 2 with half-cycle control. It will be seen that the components 47, 48, 51 are omitted, and the firing signal from the bistable circuit 13 is applied to the gates of both rectifiers 45, 49. In place of the components 39, 41, 42, 43 the lines 16, 17 are connected to opposite ends of the primary winding 81 of a transformer the secondary winding 82 of which has its ends connected to the anodes of diodes 83, 84, the cathodes of which are connected through a resistor 85 and capacitor 86 in series to the base of the transistor 33. A point between the resistor 85 and capacitor 86 is connected through a Zener diode 87 to the mid-point of the winding 82, and it will be seen that the circuit 13 receives an input at the commencement of each half-cycle.

Having thus described our invention what we claim as new and desire to secure by Letters Patent is:

1. An A.C. control circuit for controlling the value of a parameter by varying the mean current flow in a load, comprising in combination an A.C. supply, switch means connected in series with said load across said A.C. supply, said switch means being reverse biased by said A.C. supply at the termination of each cycle thereof and thereby turned off, a pulse generator, means varying the frequency of said pulse generator in accordance with the value of said parameter, said pulse generator having a frequency which is greater than the frequency of the A.C. supply when the value of the parameter is below a predetermined value, but which decreases as the value of the parameter increases, a bistable circuit coupled to said A.C. supply and to said pulse generator, said bistable circuit having first and second stable states and being driven to said first state by pulses received from said pulse generator, said A.C. circuit driving the bistable circuit to its second state at the commencement of each cycle of the A.C. supply unless the bistable circuit is already in its second state, and means operable by the bistable circuit when driven to its second state for turning said switch means on.

2. A circuit as claimed in claim 1 in which said switch means comprises first and second control rectifiers connected in parallel with the anode of the first controlled rectifier connected to the cathode of the second controlled rectifier, said switch means incorporating means whereby firing of the first controlled rectifier at the commencement of a half-cycle causes the second controlled rectifier to become conductive at the commencement of the next half-cycle so that current flows through the load for a full cycle.

3. A circuit as claimed in claim 2, including a monostable circuit coupling said bistable circuit to said controlled rectifiers, said monostable circuit having a stable state and an unstable state to which it is driven by said bistable circuit when said bistable circuit is driven to its second state, and said monostable circuit when in its unstable state applying a firing signal to said first controlled rectifier.

4. A circuit as claimed in claim 3, including a phase advance network coupling said A.C. supply to said bistable circuit, said phase advance network ensuring that said bistable circuit is driven to its second state just before the commencement of a cycle of said A.C. supply, so that said monostable circuit supplies said firing signal to said first controlled rectifier whilst said first controlled rectifier is reverse biased by said A.C. supply, the period for which said monostable circuit is in said unstable state being sufficient to ensure that said firing signal will still be present at the commencement of the next cycle of the A.C. supply.

5. A circuit as claimed in claim 1 including means for ensuring that said bistable circuit is not driven to said second state if it receives input pulses simultaneously from said A.C. supply and said pulse generator.

6. A circuit as claimed in claim 1 in which the pulses supplied to said bistable circuit by said A.C. supply are wider than the pulses supplied to said bistable circuit by said pulse generator.

7. A circuit as claimed in claim 1 in which said load is the heater of a furnace, and said parameter is the temperature of said furnace.

8. An A.C. control circuit for controlling the value of a parameter by varying the mean current flow in a load, comprising in combination an A.C. supply, switch means connected in series with said load across said A.C. supply, said switch means being reverse biased by said A.C. supply at the termination of each half-cycle thereof and thereby turned off, a pulse generator, means varying the frequency of said pulse generator in accordance with the value of said parameter, said pulse generator having a frequency which is greater than the frequency of the A.C. supply when the value of the parameter is below a predetermined value, but which decreases as the value of the parameter increases, a bistable circuit coupled to said A.C. supply and to said pulse generator, said bistable circuit having first and second stable states and being driven to said first state by pulses received from said pulse generator, said A.C. circuit driving the bistable circuit to its second state at the commencement of each half-cycle unless the bistable circuit is already in its second state, and means operable by the bistable circuit when driven to its second state for turning said switch means on.

9. A circuit as claimed in claim 8 in which said switch means comprises first and second controlled rectifiers connected in parallel with the anode of the first controlled rectifier connected to the cathode of the second controlled rectifier, terminals to which the gates of the said controlled rectifiers are connected, means coupling said terminals to said bistable circuit whereby said bistable circuit when driven to said second state applies a firing signal to said terminals, so that one or other of the controlled rectifiers is switched on and conducts until it is reverse biased to the end of the half-cycle.

10. A circuit as claimed in claim 8 including a monostable circuit coupling said bistable circuit to said switch means, said monostable circuit having a stable state and an unstable state to which it is driven by said bistable circuit when said bistable circuit is driven to its second state, and said monostable circuit when in said unstable state turning said switch means on.

11. A circuit as claimed in claim 8 including means whereby said bistable circuit is not driven to its second state in the event that it receives pulses simultaneously from said A.C. supply and said pulse generator.

12. A circuit as claimed in claim 8 in which said load is the heater of a furnace and said parameter is the temperature of said furnace.

References Cited

UNITED STATES PATENTS

| | | | |
|---|---|---|---|
| 3,109,910 | 11/1963 | Fogleman | 323—22 |
| 3,192,466 | 6/1965 | Sylvan et al. | 323—22 |
| 3,250,978 | 5/1966 | Moscardi | 323—22 |
| 3,283,179 | 11/1966 | Carlisle et al. | 323—22 |
| 3,303,416 | 2/1967 | Paice et al. | 323—18 |

JOHN F. COUCH, *Primary Examiner.*

A. D. PELLINEN, *Assistant Examiner.*